United States Patent [19]
Stodder et al.

[11] Patent Number: 5,651,623
[45] Date of Patent: Jul. 29, 1997

[54] MULTIPLE-FUNCTION PRINTER WITH COMMON FEEDER/OUTPUT PATH MECHANISMS AND METHOD OF OPERATION

[75] Inventors: Samuel A. Stodder, Encinitas; Steven O. Stocker, Escondido, both of Calif.

[73] Assignee: Hewlett-Packard Company, Palo Alto, Calif.

[21] Appl. No.: 585,058

[22] Filed: Jan. 11, 1996

Related U.S. Application Data

[63] Continuation-in-part of Ser. No. 145,355, Oct. 29, 1993.
[51] Int. Cl.[6] ................................... B41J 13/10
[52] U.S. Cl. .................. 400/605; 400/624; 358/296
[58] Field of Search ................... 400/605, 624, 400/625, 629; 358/296

[56] References Cited

U.S. PATENT DOCUMENTS

| | | | |
|---|---|---|---|
| 4,511,904 | 4/1985 | Takahashi | 400/624 |
| 4,729,683 | 3/1988 | Staniszewski | 400/624 |
| 4,802,778 | 2/1989 | Takahashi et al. | 400/624 |
| 5,124,800 | 6/1992 | Hashimoto | 358/296 |
| 5,162,916 | 11/1992 | Stemmle et al. | 358/296 |

Primary Examiner—Christopher A. Bennett

[57] ABSTRACT

A multiple-function printing device provides for picking pages from a stack of sheets in an input feeder for roller-driven movement along a first path through a printing station to an output, and for picking pages from a stack of documents in an input feeder for roller-driven movement along a second path through a scanning station to an output, with at least a portion of the first and second paths being commonly shared, and with common mechanisms being used for various steps such as for picking, providing roller-driven movement through the processing stations, and for actuating a pressure plate in the input feeders. A document guide in a document scanning mode of operation is pivoted into a lowered position generally parallel to the print station platen to constrain and contain the top and bottom of any curled document exiting from the scan station into an output roller nip so as to prevent an incipient paper jam. Prior to a printing mode of operation on a paper sheet, the document guide is pivoted about 100° so that it does not interfere with an incoming print cartridge.

20 Claims, 17 Drawing Sheets

MULTIPLE-FUNCTION PRINTER WITH COMMON FEEDER/OUTPUT PATH MECHANISMS AND METHOD OF OPERATION

This application is a continuation-in-part of application Ser. No. 08/145,355, filed Oct. 29, 1993, abandoned.

Related Application

This application relates to U.S. Ser. No. 08/144,943 filed Oct. 29, 1993 by Samuel A. Stodder, now U.S. Pat. No. 5,391,009 issued Feb. 21, 1995.

BACKGROUND OF THE INVENTION

This invention relates generally to printers and facsimile devices, and more particularly to printers and facsimile devices and their operation which are combined together to form a multiple-function product.

Facsimile devices (i.e., fax machines) have been used for many years to transmit documents containing text or graphical images through a modem via telephone lines through another modem to a remote destination. In its basic form, a conventional fax machine is used for three separate functions: sending a first document; receiving a second document; and producing a hardcopy printout of the second document. Of course the hardcopy printout is not the actual second document but rather a close facsimile thereof. Thus, sending the contents of the second document via fax avoids going to the trouble, expense and delay of actually delivering the second document to a remote destination.

An enhanced fax machine can also be used to perform two additional functions: producing a hardcopy printout of the first document; and producing a hardcopy printout of a cumulative report showing an itemized listing of date, time, and destination for first documents sent from the fax machine.

It is therefore apparent that a fax machine acts primarily as both a sender (i.e., scanning and transmitting) and receiver of documents, and that the fax machine also acts secondarily as a printer (i.e., printing a facsimile of a second document, printing a copy of a scanned first document, or printing an itemized report) and secondarily as a convenience copier (i.e., scanning/printing a first document).

Both the basic fax machine and the enhanced fax machine just described have used two separate paper paths. One path is dedicated to the first document and typically includes document feeder tray, document paper pick/paper drive system, document scanning station, and document output. Another path is dedicated to the printout (originally roll-fed, now sheet-fed) and typically includes sheet feeder tray, sheet paper pick/sheet drive system, sheet printing station, and sheet output. As a result, a fax machine is a bulky, expensive multiple-function device which requires a large number of parts for duplicate paper handling functions.

BRIEF SUMMARY OF THE INVENTION

It is an object of the present invention to provide a fax machine with common feeder/output mechanisms for documents passing through a scanning printing station and for sheets passing through a printing station.

Another important object is to provide a multiple-function printer/fax machine which is primarily a printer peripheral for a computer as well as primarily a fax machine, having integrated shared paper path and common mechanisms for scanning documents on the one hand and for producing hardcopy printout sheets on the other hand.

Still another object is to provide a multiple-function printer/fax machine with a pressure plate feeder scheme which will enable fast reliable automatic feeding of a large stack of documents up to about twenty-five pages as well as a large stack of printout sheets up to about one hundred pages. A related object is to provide dual feeder paths into a common paper pick, with self-actuating shifting means for automatically changing from a printing mode to a scanning mode whenever a document is placed in an automatic document feeder tray.

A further object is to provide a multiple function machine having a single drive motor for picking individual pages from a stack and for moving individual pages past each processing station such as a scanning station and/or a printing station. A related object is to provide gear means from the single drive motor for driving a primary drive roller, a paper pick roller, and an output roller at different rates, and for moving a feeder pressure plate to and fro between positions of engagement and disengagement.

An additional object is to provide the aforementioned multiple function machine with a self-actuating delay mechanism for spacing apart individual pages which are sequentially picked from a document stack or a printout sheet stack.

In one embodiment of the invention, the common document/sheet path and shared mechanisms include a pressure plate, pick roller assembly, drive roller system, and drive motor wherein documents proceed actively through a scanner station and passively through a printer station and printout sheets proceed passively through the scanner station and actively through the printer station, both to a common output. In one alternate embodiment of the invention, the common document/sheet path and shared mechanisms include a drive Toller system and output, wherein documents proceed actively through a scanner station and passively through a printer station and printout sheets bypass the scanner station and proceed actively through the printer station, both to a common output. In another alternate embodiment of the invention, the common document/sheet path and shared mechanisms include a common path through a main drive roller system, a combined scanner/printer station and output, with separate pick rollers and separate pressure plates driven by the drive motor for the main drive roller system.

When using a common paper path for scanning and printing, media that feeds through the device can range from original sheet stock to highly curled, bent or otherwise deformed documents. Provisions are made in this invention to properly move the media from roller to roller without incurring paper jams. Sheet media for printing is typically in good form and does not always require a paper path constraint on both faces of the paper. For a translating carriage type printer (i.e. typical inkjet printer), the space above the paper in the printing region is used for moving the print cartridge across the paper in close proximity. Documents for scanning can be in bad form and have been found to require top and bottom face constraint throughout the paper path. Thus, this invention includes a means to constrain both faces of documents which pass through the print region and when printing on original sheet stock does not interfere with the print cartridge.

This improvement includes a document guide located above the paper path in the printing area which guides the document into the output roller nip.

The document guides allows for deformed documents to be reliably moved through a common paper path multi-function printer. This results in a lower cost multi-function printer without compromising the reliability of the document feeding function.

DETAILED DESCRIPTION OF THE PREFERRED EMBODIMENTS

Generally speaking, the invention provides for picking pages from a stack of sheets in an input feeder for roller-driven movement along a first path through a printing station to an output, and for picking pages from a stack of documents in an input feeder for roller-driven movement along a second path through a scanning station to an output. Depending on the particular implementation, at least a portion of the first and second paths are commonly shared, and common mechanisms are used for various steps such as for picking, providing roller-driven movement through the processing stations, and for actuating a pressure plate in the input feeders.

Figure 1:
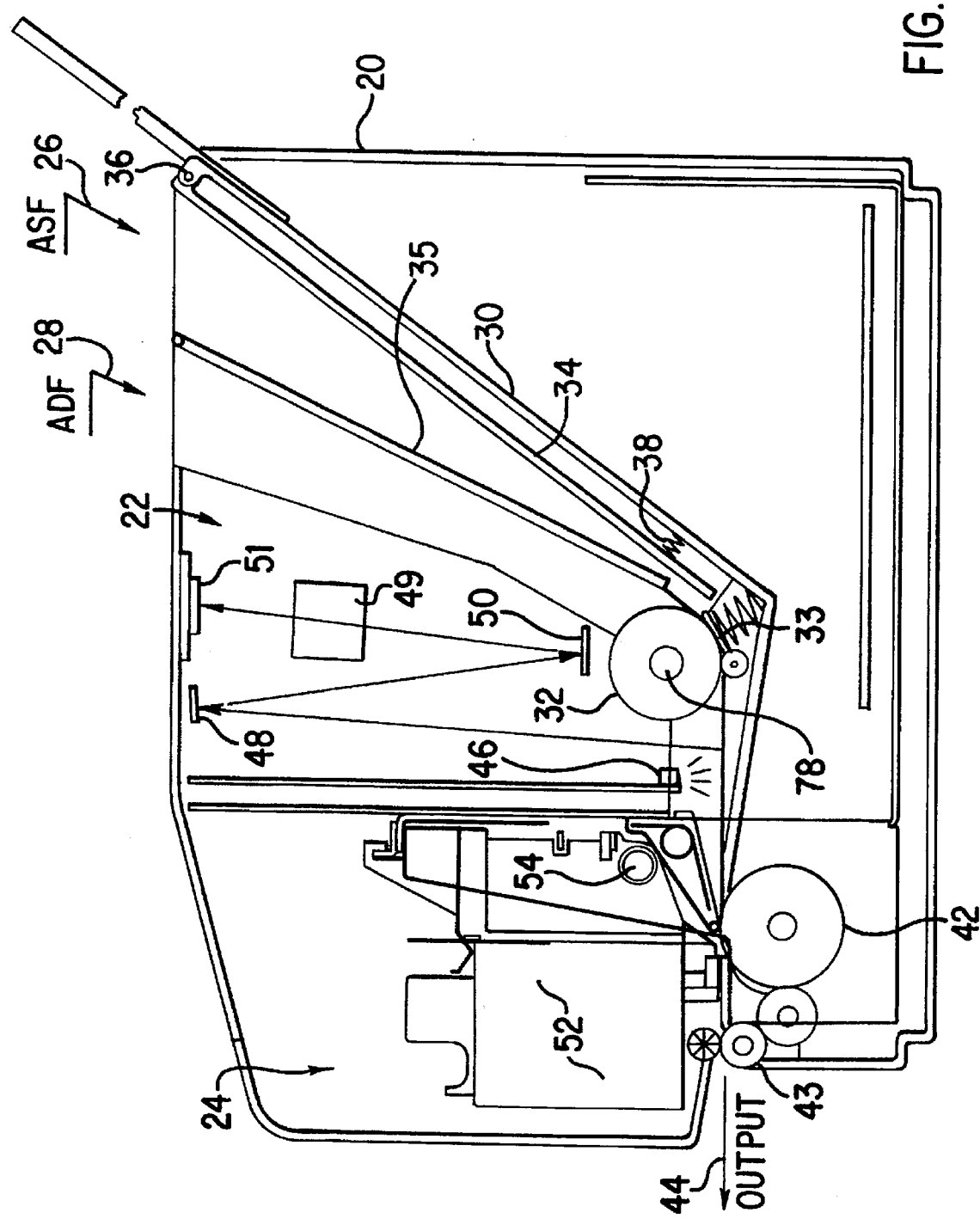
FIG. 1 is a schematic side view of a presently preferred printer/facsimile embodiment of the present invention.
Figure 2:
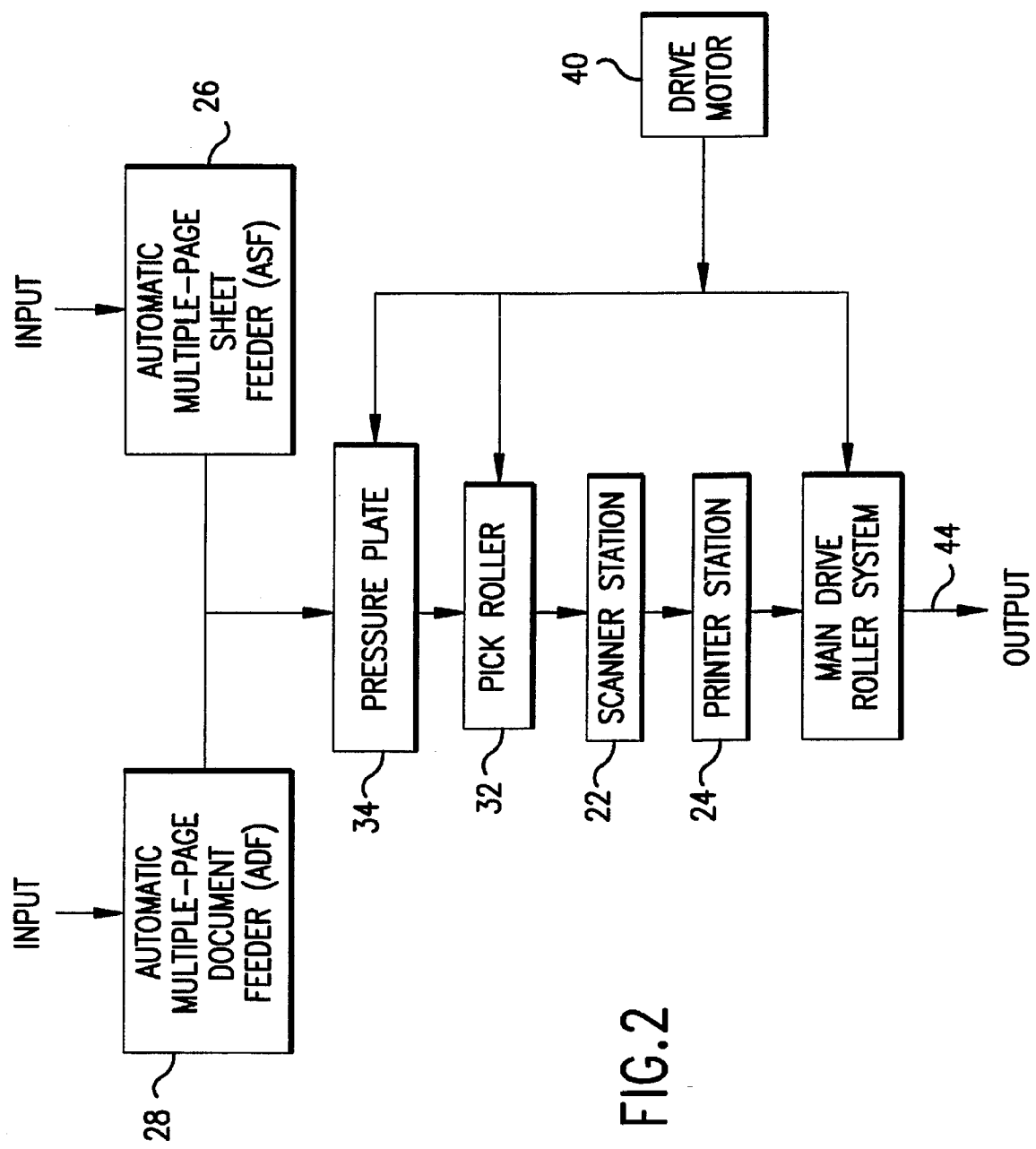
FIG. 2 is a functional block diagram of the embodiment of FIG. 1.
Figure 8:
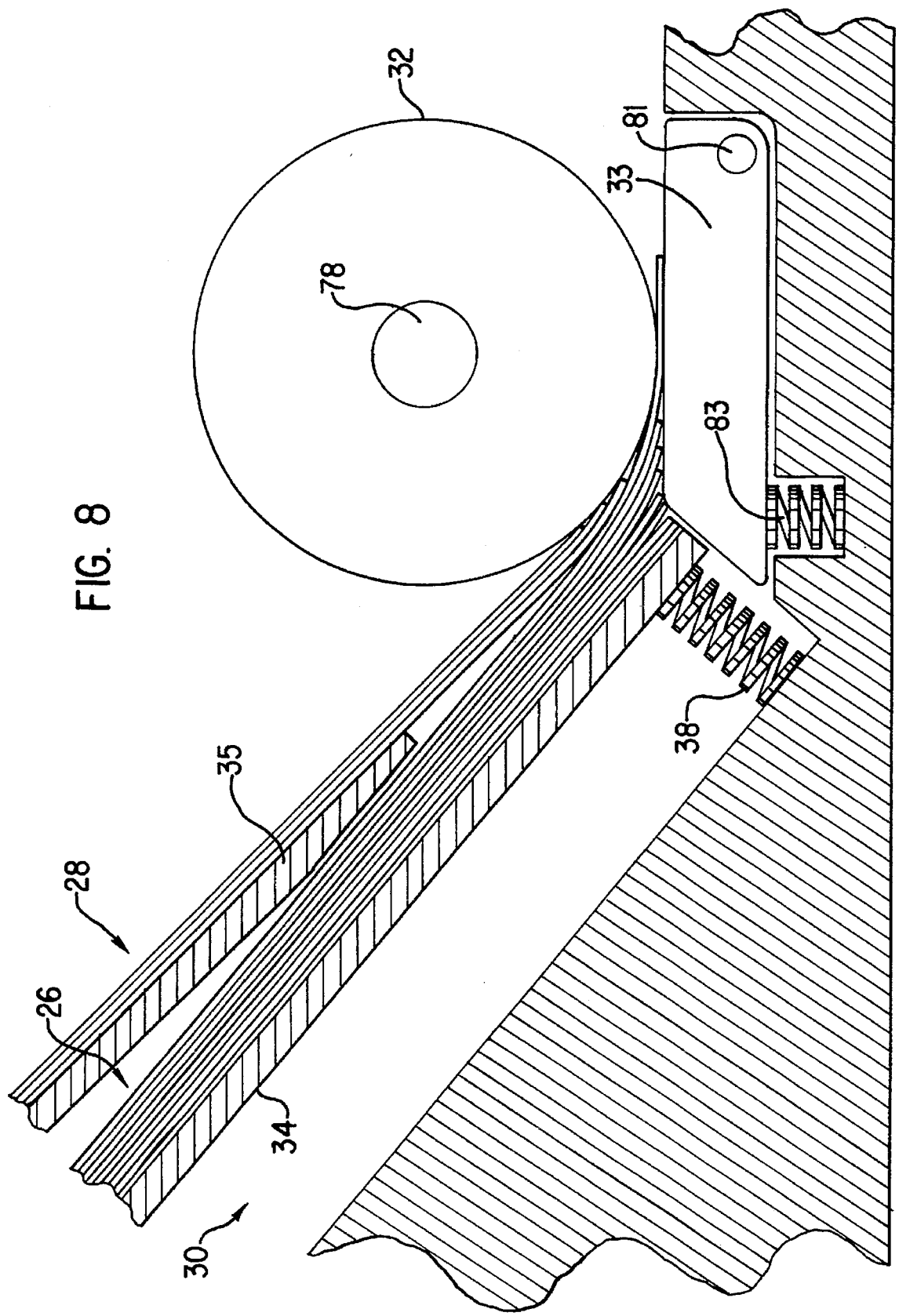
FIG. 8 is a close-up schematic showing a pick roller ready to begin a reverse rotation kicking partially picked sheet(s) backward into the ASF as a result of a document stack being inserted into the ADF.
Figure 9:
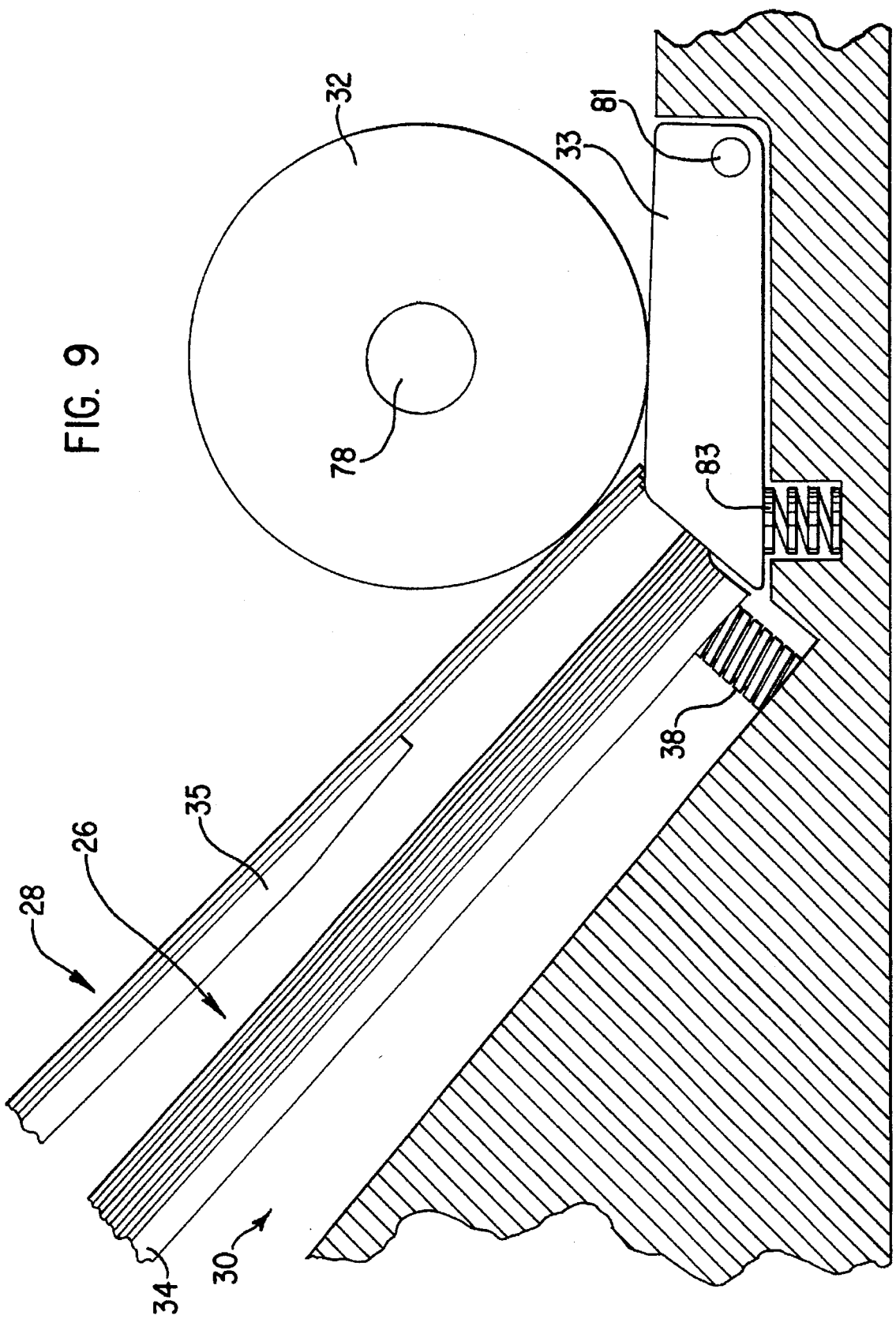
FIG. 9 is a close-up schematic showing the pressure plate in disengaged position and all of the partially picked sheets expelled from underneath the pick roller into the ASF.
Figure 10:
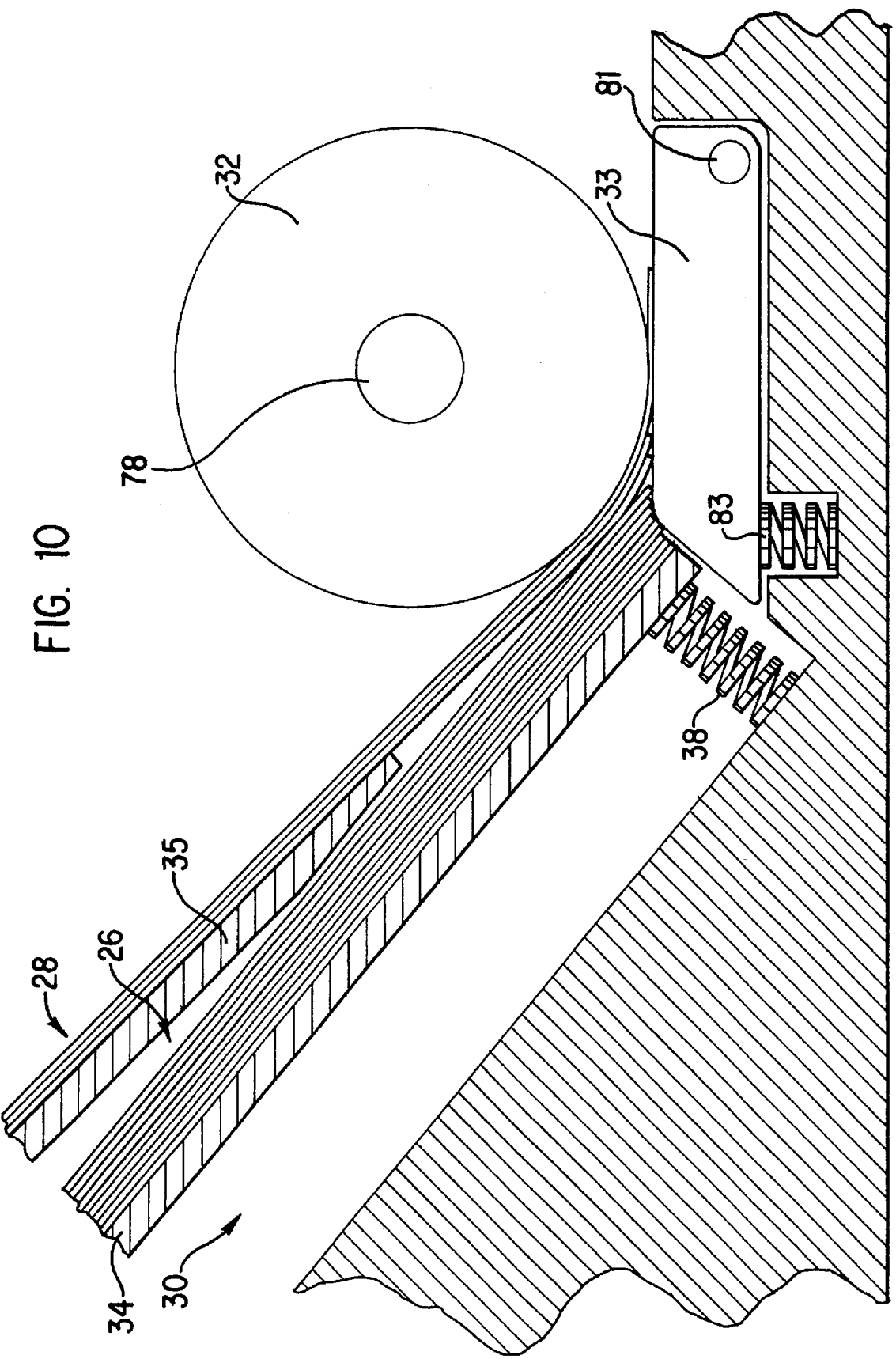
FIG. 10 is a close-up schematic showing the pressure plate returned to an engaged position with the pick roller already commencing to pick a page from the top of the stack of documents which now partially overly the stack of print sheets.

Referring more particularly to FIGS. 1–2, the multiple-function device of the presently preferred embodiment includes a frame 20 for housing a scanner station 22 and a printer station 24. A stack of print sheets is loadable into an automatic sheet feeder (ASF) 26, and a stack of documents having text/graphics to be scanned is loadable into an automatic document feeder (ADF) 28 which together form a common input feeder slot 30 having a pick roller 32 and a spring-loaded stripper pad 33 at the lower end. The upper portion of the input feeder slot which constitutes the ADF is separated from the ASF by a divider 35. The divider is truncated at its lower end to allow document stacks and sheets stacks to converge at the pick roller (see FIGS. 8–10). A pressure plate 34 is attached at its upper end through pivot pin 36 to the frame and is normally biased upwardly against the pick roller by springs 38. A drive motor 40 is connected through a gear mechanism to the pressure plate 34 and pick roller 32 as described in more detail hereinafter, and is also connected to a main drive roller 42 which pulls the pages through the processing stations for either scanning or printing. The printout pages as well as the scanned pages pass across an output roller 43 to be deposited in a common output area 44.

The scanner and printer stations in the drawings are for purposes of illustration only and are of conventional design, except for their unique locations along a shared path using shared mechanisms. In that regard, scanner station 22 includes a lamp 46 for illuminating a scanning zone, reflective mirrors 48, 50, a lens 49, and a CCD (charge-coupled device) photosensor 51. Printer station 24 includes inkjet cartridge 52 which rides on a slider rod 54 back and forth across a print zone.

Figure 11:
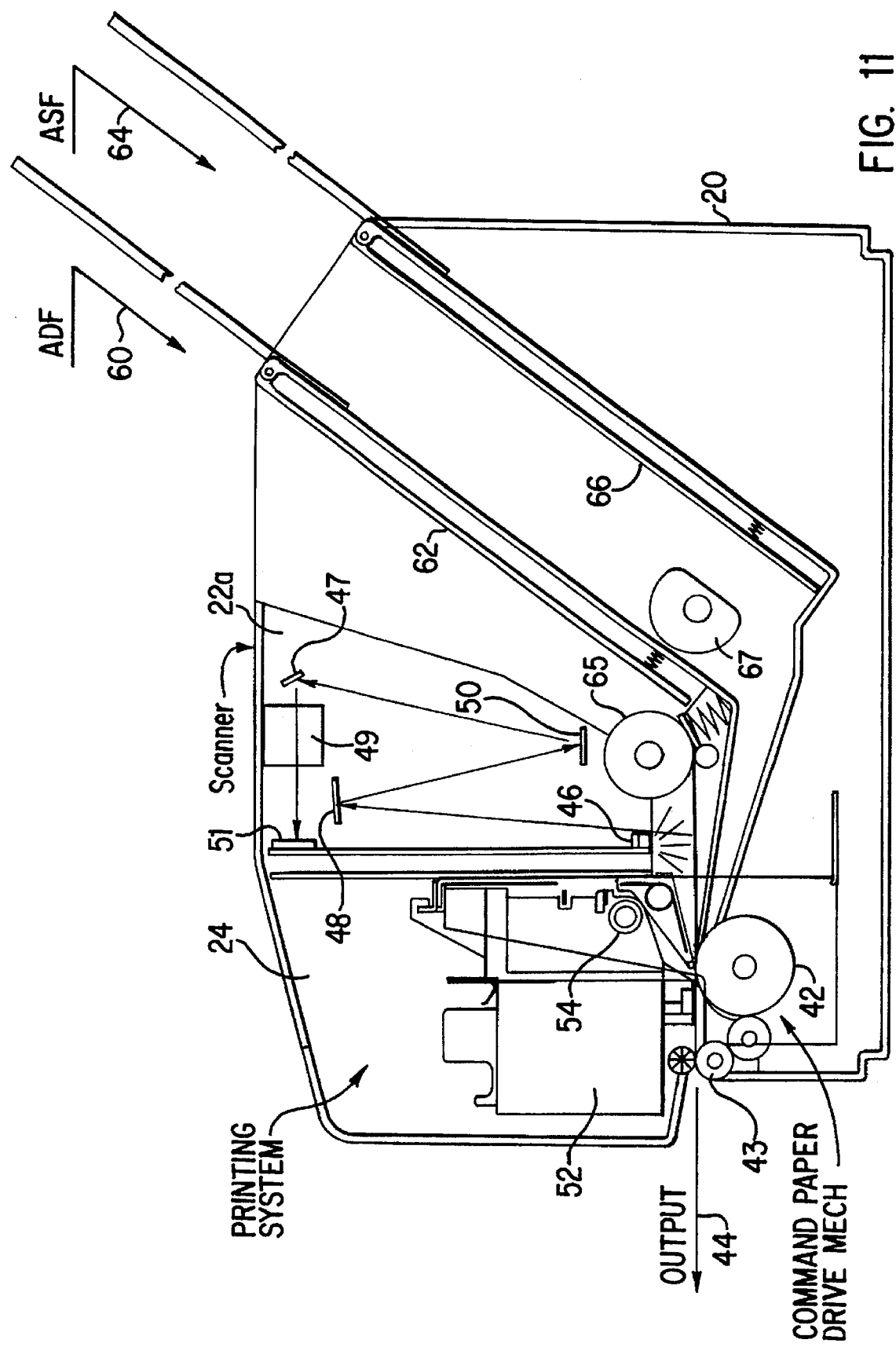
FIG. 11 is a schematic side view of an alternate printer/facsimile embodiment of the present invention.
Figure 12:
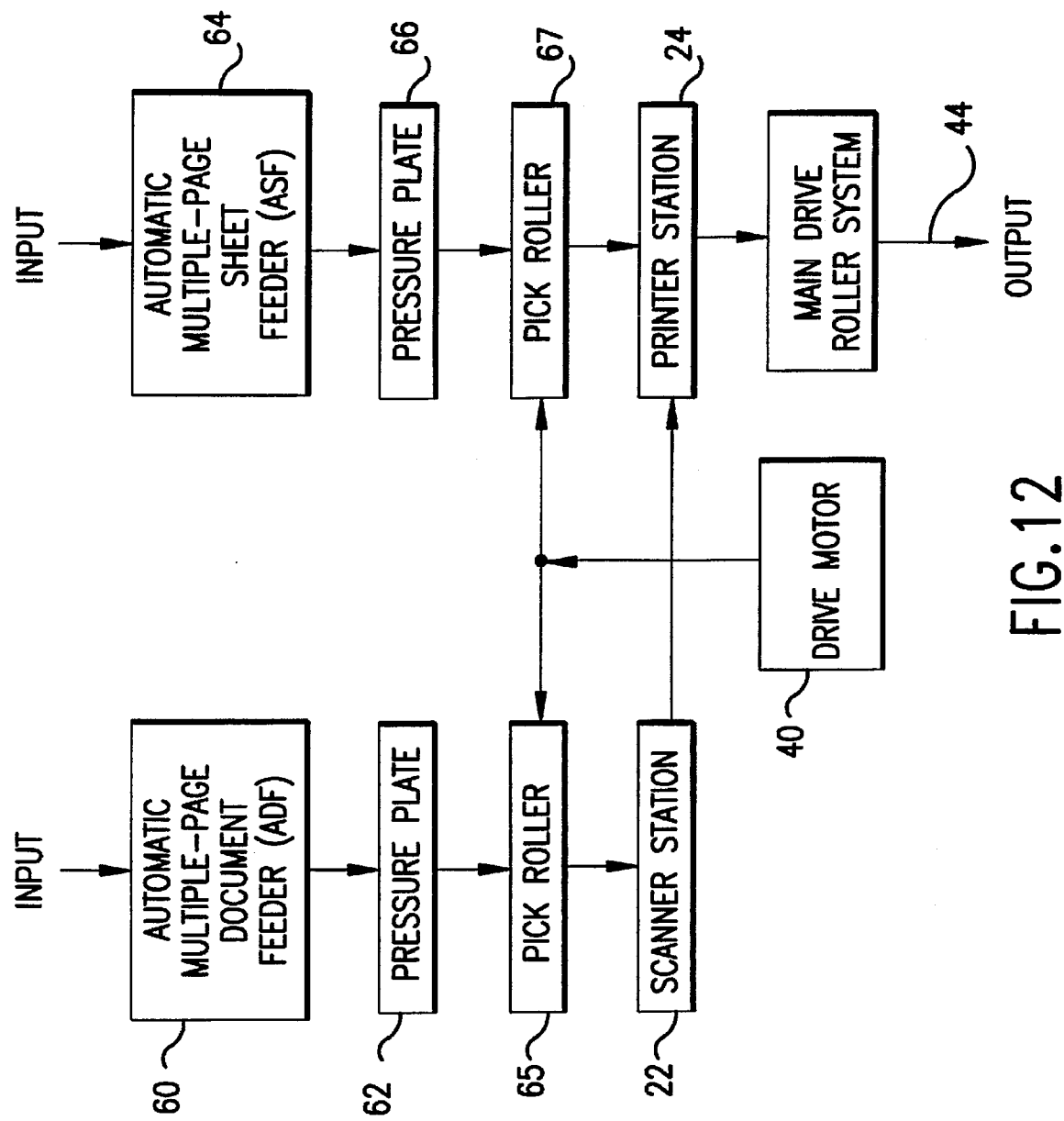
FIG. 12 is a functional block diagram of the embodiment of FIG. 11.

In the alternate embodiment of FIGS. 11–12, the common document/sheet path and shared mechanisms are similar to FIGS. 1–2 and include scanner station 22a, printer station 24, drive motor 40, main drive roller 42, output roller 43 and a shared output 44 wherein document pages proceed actively through the scanner station and passively through the printer station, and printout sheet pages bypass the scanner station and proceed actively through the printer station, both to a common output. However, ADF 60 has its own pivotally mounted spring-loaded pressure plate 62 to facilitate reliable page feeding to document pick roller 63, and ASP 64 has its own pivotally mounted spring-loaded pressure plate 66 to facilitate reliable page feeding to sheet pick roller 67, with both pick rollers 65, 67 being driven by the drive motor 40.

Figure 13:
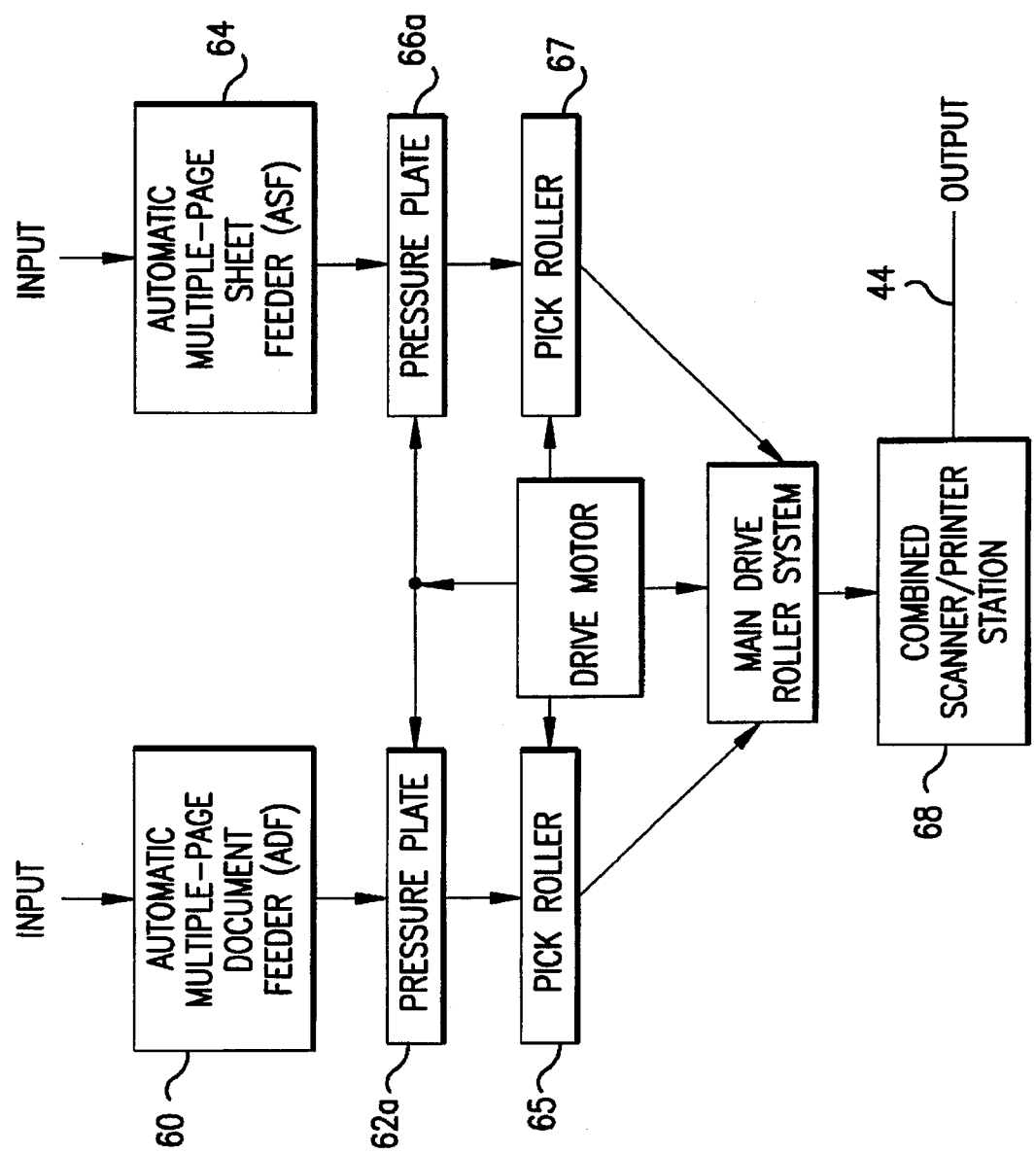
FIG. 13 is a functional block diagram of another alternate printer/facsimile embodiment of the present invention.

In another alternate embodiment of FIG. 13, the common document/sheet path and shared mechanisms are similar to FIGS. 11–12. But this alternate embodiment provides a common path through a combined scanner/printer station 68 to a common output 44, with separate pick rollers 65, 67 and separate pressure plates 62a, 66a driven by the drive motor 40 for the main drive roller system.

Referring now to FIGS. 3–6 which show further details of the preferred embodiment of FIGS. 1–2, the input feeder slot is integrated into the device so that when the unit is resting with its feet 69 on a desk top, stacks of sheets or documents can be added without having to remove any tray. Since the frame is supported by legs 71 so that the input feeder slot is angled downwardly, both of the stacks naturally settle to the bottom of the slot so that the leading edges of pages on top of the stacks will impinge against the pick roller (see FIGS. 8–10). The action of the pressure plate against both stacks assures proper separation by the spring-loaded stripper pad 33 in combination with the rotation of the pick roller 32.

The ADF includes an extender 70 mounted on the upper end of the divider 35 which pivots forwardly out of the way when pages are added or removed from the ASF. The ASF is sandwiched between the ADF and the bottom of the feeder slot and includes its own extender 72 as well as a single adjustable guide 74 for maintaining the sheet stack in proper positioning for feeding into the pick roller.

It will be understood by those skilled in the art that proper feeding/picking of pages from a large quantity stack of virginal printing paper in the ASF is a somewhat easier task than proper feeding/picking of variously sized partially bent pages of stacked documents in the ADF having text/graphics thereon. Therefore the ADF is positioned above the ASF for better picking by the pick roller and easier access for accurate and proper loading between dual adjustable guides 76. The automatic action of the pressure plate 34 as described in more detail hereinafter also helps to assure proper feeding of pages from the ASF for printing or pages from the ADF for scanning.

The pick roller 32 is mounted on a pick shaft 78 which has a pair of guide rollers 80 also mounted thereon in the commonly shared paper path, as well as double-pin delay coupler 81 mounted on the shaft end outside the frame. The guide rollers 80 and matching pinch rollers 82 help to hold the pages in proper position as they move past the pick roller to the scanning and printing stations.

Figure 3:
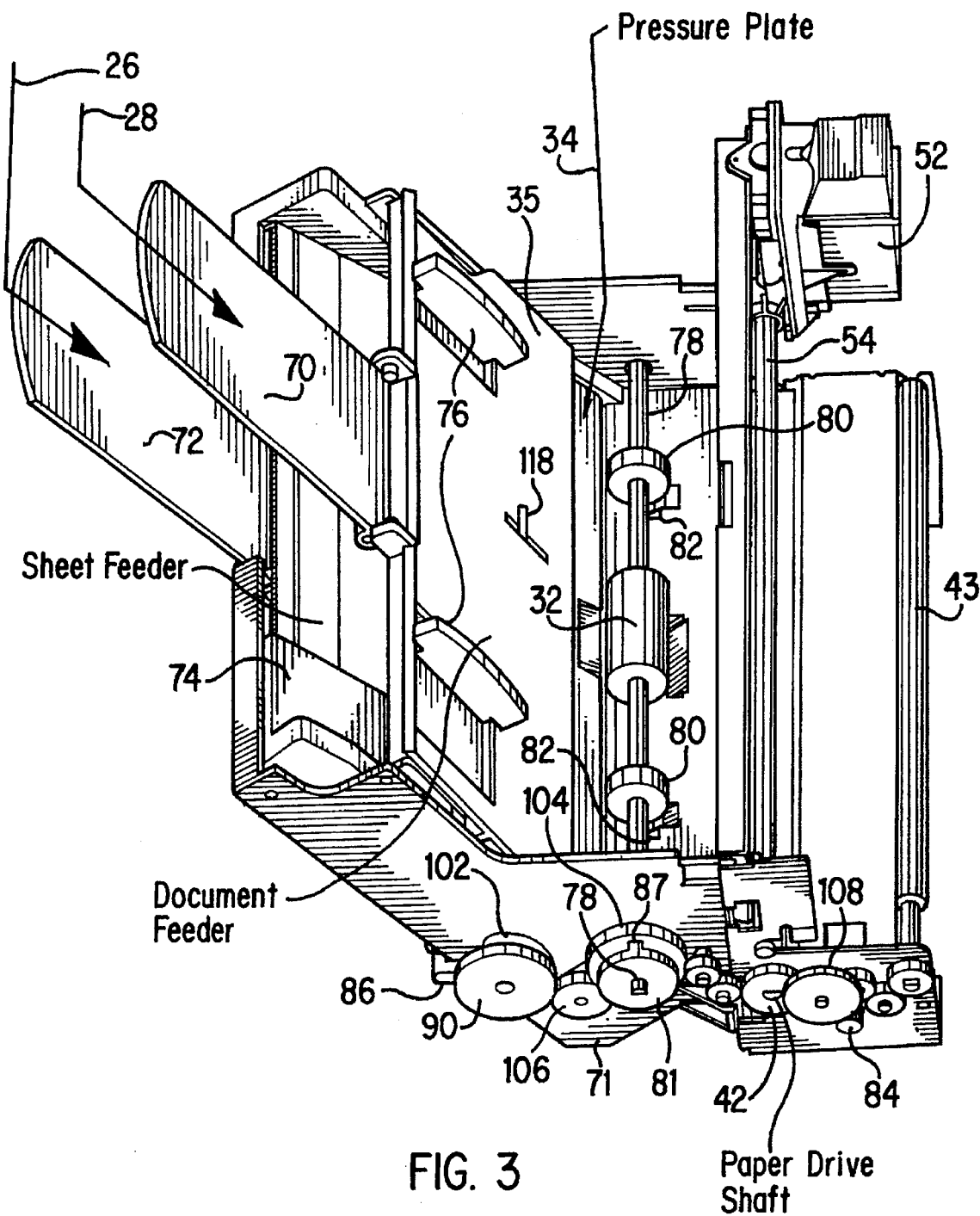
FIG. 3 is an isometric view looking down into an implementation of the embodiment of FIG. 1.
Figure 4:
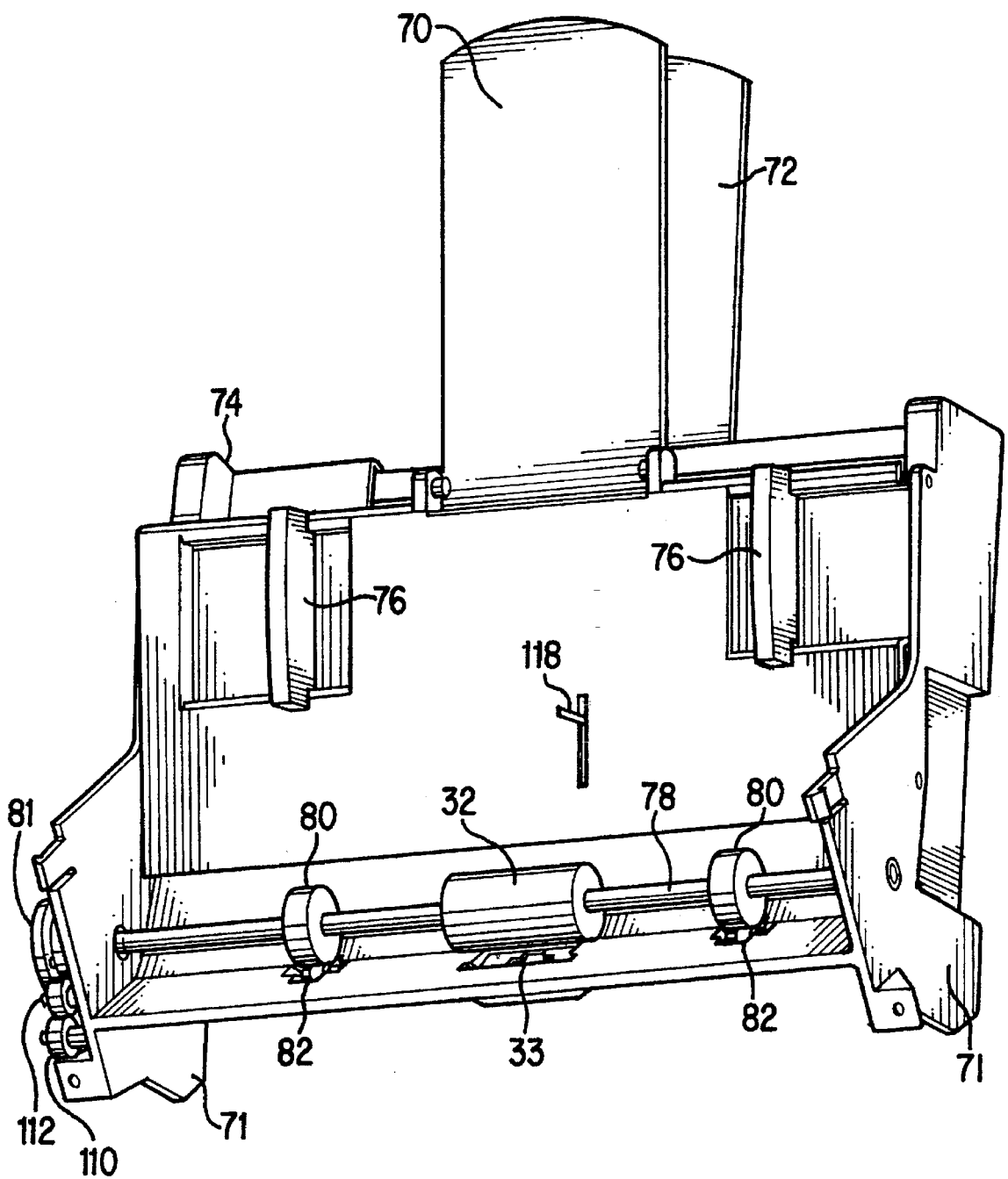
FIG. 4 is a fragmentary isometric view showing the input feeder slots and pick roller portion of FIG. 3.
Figure 5:
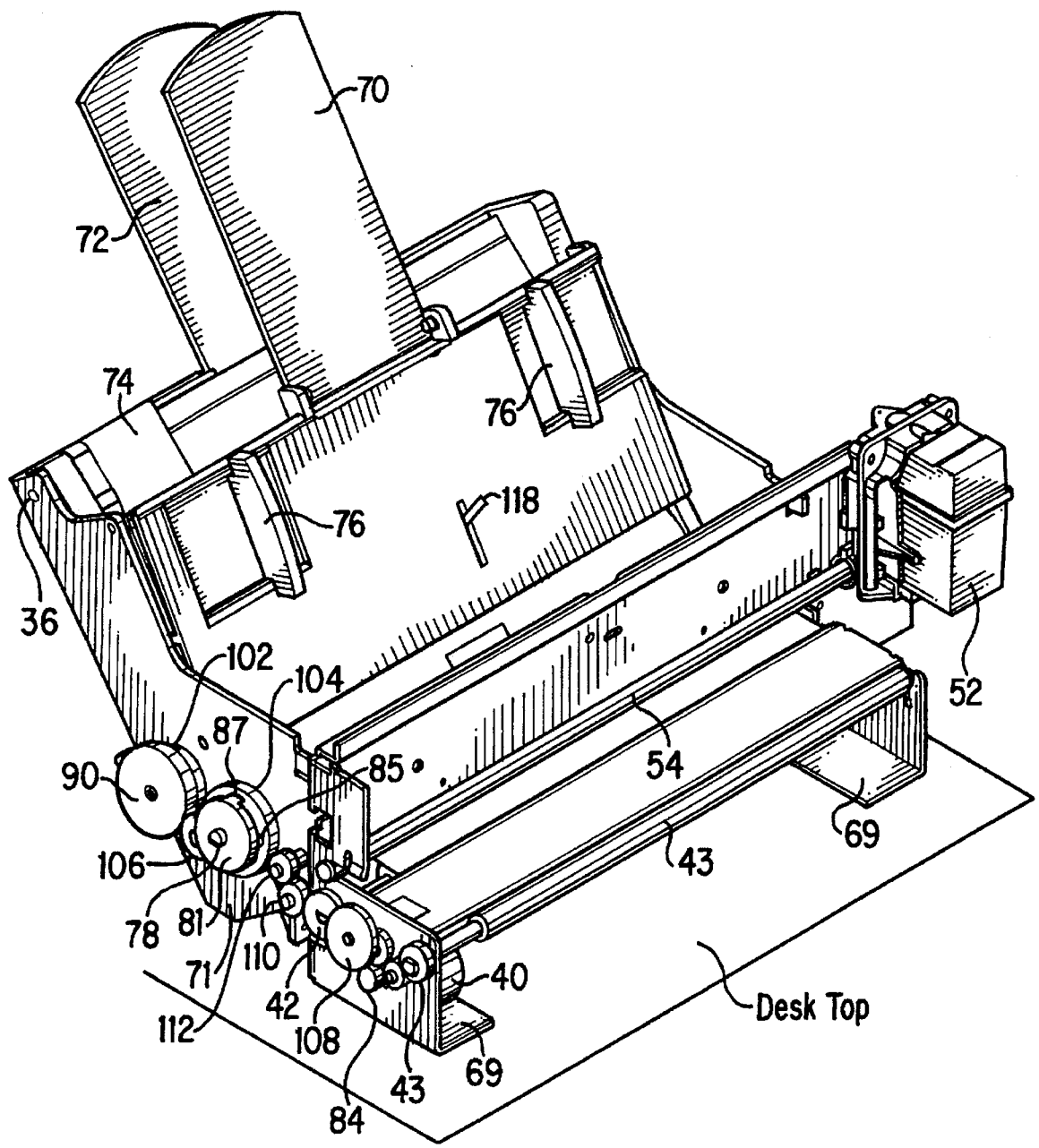
FIG. 5 is a front isometric view of FIG. 3.
Figure 6:
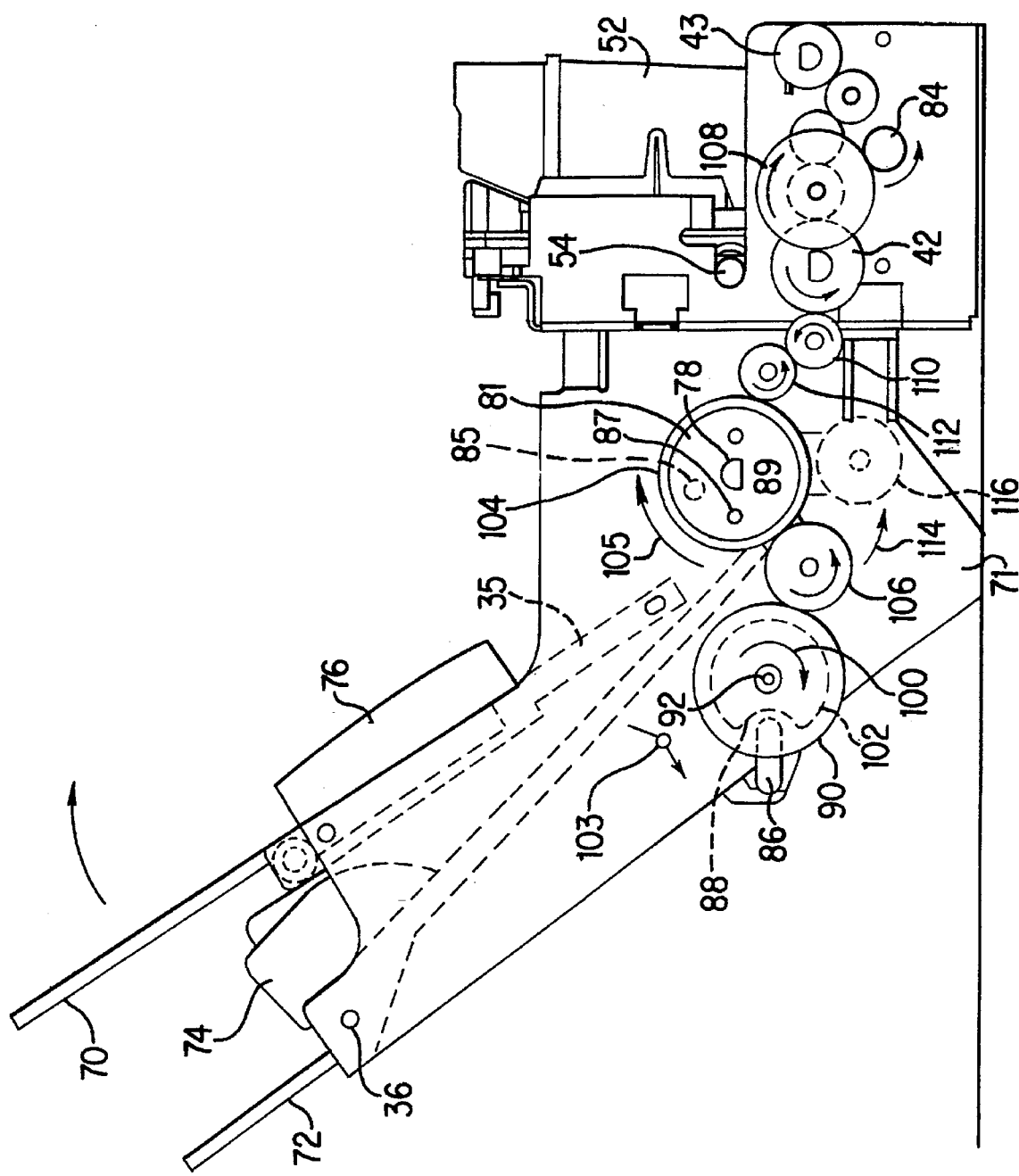
FIG. 6 is a side view of FIG. 3.
Figure 7:
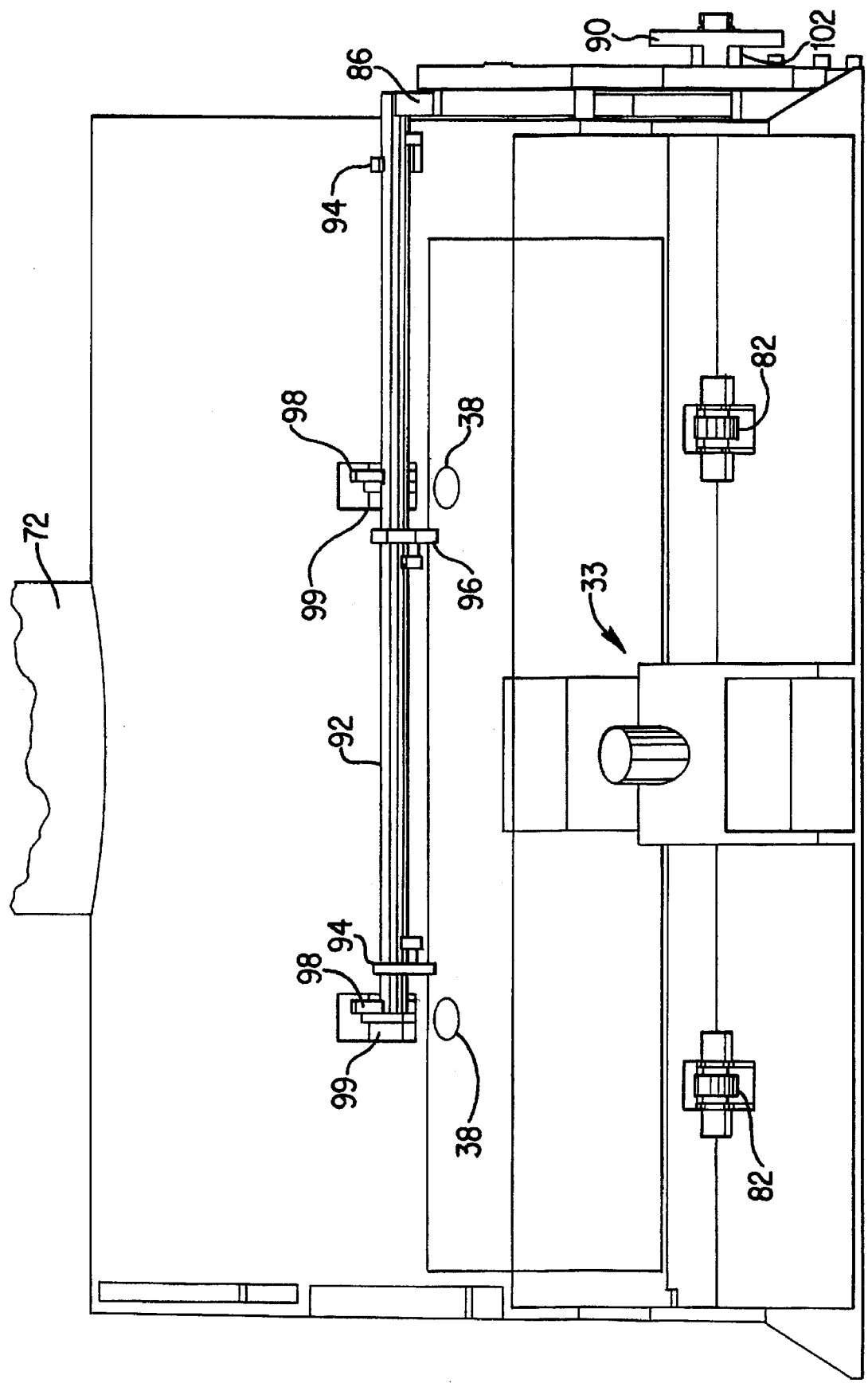
FIG. 7 is a fragmentary back view looking up at the feeder slots and pick roller portion of FIG. 4.

A unique gear mechanism is shown in FIGS. 3 and 6-7 for automatically moving the pressure plate to and fro between a disengaged position "open" position and an engaged "closed" position. The disengaged open position allows access to the stacks for removal, replenishment, or replacement of pages as well as for realignment of the stacks between one or more page picking events if that is deemed to be desirable and necessary to avoid mis-feeds. More importantly from a multiple-function point of view (see FIGS. 8-10), the disengaged open position allows new pages of documents to be placed in the ADF with their leading edges resting on top of the sheet stack in the ASF, thereby preparing for a scanning operation to commence.

The engaged closed position holds the sheet stack in aligned position together as a unit if there are not any documents in the ADF. This helps to prevent more than one page from being accidently picked. The engaged closed position holds the document stack in aligned position together as a unit if there are not any sheets in the ASF. If there is already a stack of sheets in the ASP and some additional document pages have been added to the ADF, then the engaged closed position holds both the document stack and the underlying sheet stack in aligned position together as a composite stack insofar as their leading edges are concerned.

FIG. 6 shows the gear mechanism in a "start disengagement" position, with motor drive gear 84 moving in reverse direction to cause main drive roller 42 to also go in reverse. Coupling pin 85 on linkage gear 104 is partway between forward direction coupling pin 87 and rearward direction coupling pin 89 on delay coupler 81. This assures that commencing the reverse driving of the pick roller to expel partially picked pages does not occur until after the pressure plate has been moved into disengagement position.

Cam follower 86 is resting in a notch on cam 88 which is rigidly mounted for turning with pressure plate gear 90. So long as cam follower 86 remains in the notch, the pressure plate remains in closed engagement position. The connection between cam follower 86 and the pressure plate is best shown in FIG. 7. The cam follower 86 is mounted on the end of a pivot rod 92 which is mounted for pivotal rotation by a pair of brackets 94 and a counter-bracket 96. A pair of fingers 98 are also mounted on pivot rod 92 and interconnect with matching slots 99 so that when the pressure plate gear 90 is rotated in direction 100, the cam follower is forced to pivot upwardly into "disengagement position" and ride along the larger diameter surface 102. This makes the entire pivot rod 92 rotate and causes the fingers 90 to pivot the pressure plate in direction 103 into a completely retracted position of disengagement in a direction away from the pick roller 32. When the pressure plate 90 has made a complete rotation, the cam follower rides back down into the notch, thereby allowing the pressure plate to return to an "engagement position".

A linkage gear 104 is slidably mounted on the pick shaft 78 to couple the drive motor 40 to the pressure plate gear 90, and also to couple the drive motor 40 through the double-pin delay coupler 81 to the pick roller. When the motor drive gear 84 is in reverse, the linkage gear rotates in direction 105 to move its attached transfer gear 106 into link position with the pressure plate gear 86. Thus the coupling from drive motor 40 to the pressure plate gear 90 is through double-wheel gear 108, main drive gear 42, spur gears 110, 112, linkage gear 104, and transfer gear 106. Decoupling occurs when the motor drive gear 84 changes back to forward, since this changes the rotation direction of linkage gear 104 and moves transfer gear 106 in the direction 114 to a non-link position 116. The foregoing gear/cam mechanism provides for automatic movement of the pressure plate between a position of engagement of the stacks with the pick roller and a position of dis-engagement. This necessarily occurs after a page being processed at the scanning station or the printing station has passed by the main drive roller 42 and the output roller 43 to the common output area 44.

The initiation of the dis-engagement can be programmed to occur at predetermined times such as before every picking step, or whenever a mis-feed occurs, or the like. Also, when a document page is placed in the ADF, it pushes down sensor 118 to activate the aforementioned dis-engagement sequence of steps.

As best shown in FIG. 6, the delayed contact of the pin 85 on linkage gear 104 with double-pin delay coupler 81 causes the reversing of the pick roller expelling any pages from a previous picking step to occur after the pressure plate has moved to a position of dis-engagement.

As best shown in FIGS. 6, the gearing mechanism is designed to automatically provide a delay between the picking of successive pages from the sheet stack or document stack. In that regard, the gearing ratios provide for output roller 43 to rotate faster than main drive roller 42 which rotates faster than pick roller 32. The speed differential between the output roller 43 and the main drive roller 42 keeps a page in tension as it passed through the printing station, the scanning station, or the combined printing/scanning station.

The linkage gear 104 has its single pin 85 which engages one or the other of the two pins 87, 89 on the delay coupler 81 (depending on the direction of the main drive) to drive the pick roller forwardly or rearwardly with a partial revolution delay for driving the pick roller when a directional change occurs. This relationship between the linkage gear 104 and the delay coupler 81, when combined with the speed differential between the pick roller 32 and the main drive roller 42, provides for the pin on the linkage gear 104 to walk away from engagement of the pin on the delay coupler so long as a page is in driving engagement with both the pick roller and the main drive roller. In other words, during that double driving period, the pick roller is slaved to the paper and rotates faster than the linkage gear to cause the aforesaid "walk away".

When the trailing edge of the page finally leaves the pick roller, the pick roller shaft and the delay coupler mounted thereon stop, and the time it takes for the pin on the linkage gear to rotate into engagement with the pin on the delay coupler is the "delay time" which occurs between the picking of successive pages from the stack.

Thus, the aforementioned features of the present invention provide for automated operation of a printing station, scanning station or the like from a single drive motor through a gear mechanism which provides spaced-apart picking of successive pages from an input feed stack. These aforementioned features also provide for the shred use of a paper path and mechanisms which are involved along the path by a multiple-function device which employs operations such as printing, scanning and the like in the same machine.

Figure 14:
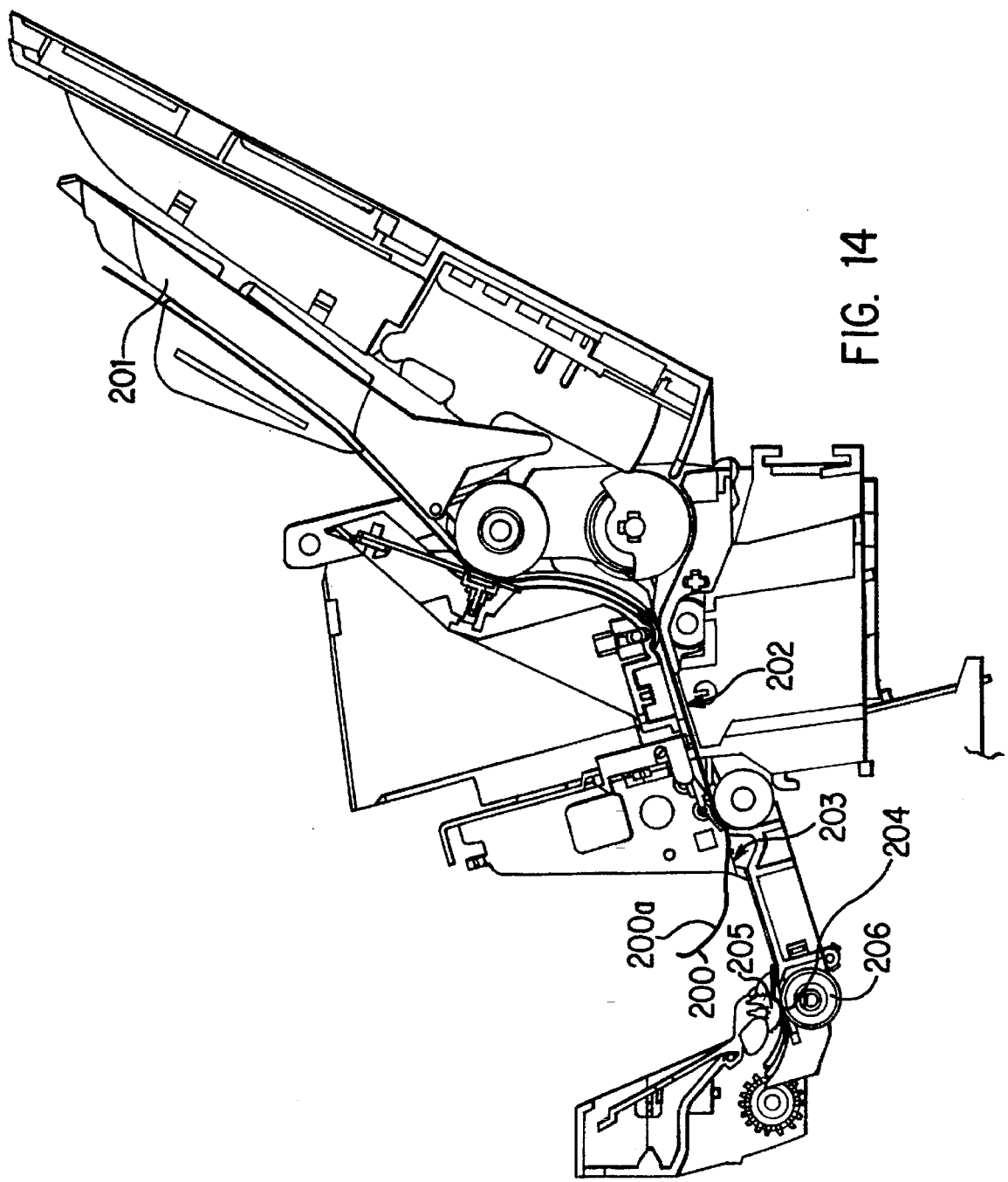
FIG. 14 is a more detailed schematic side view of the common paper path of the invention illustrating the common path with a curled document positioned immediately prior to an incipient paper jam at the output roller nip.

FIG. 14 illustrates the curling of a document 200 after the document has been fed from a document feeder 201 past a scanning station 202 where it has been scanned, passively over a printing station 203 (sans print cartridge which has slid away from the print zone) which document was destined to be conducted into a nip 204 between output rollers 205 and 206. As a curled document exits the scan station and enters the print region it is free to return to its natural curled state. Due to the curling of the document at 200a, the document is in an incipient position to cause a paper jam before reaching the nip 204.

Figure 15:
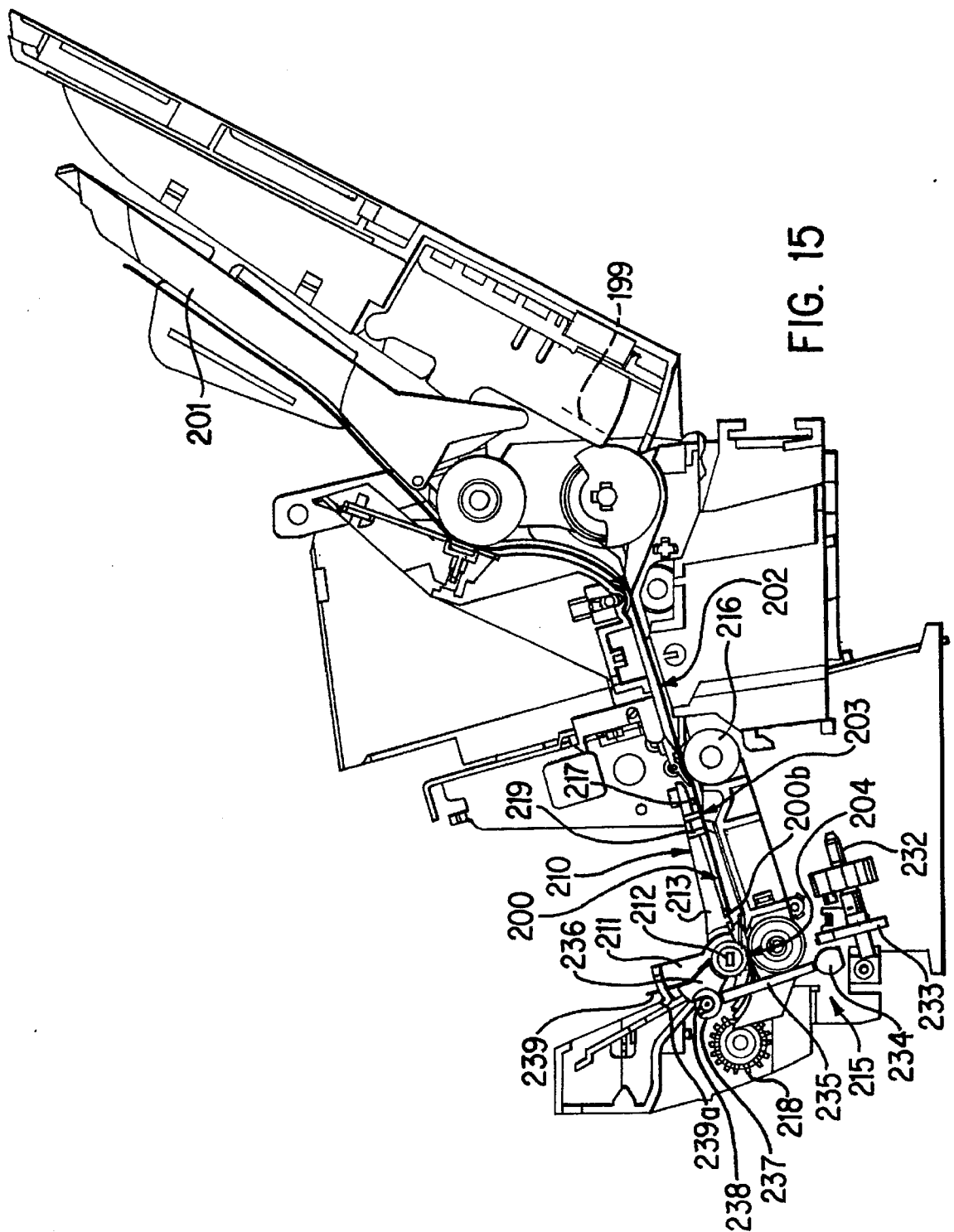
FIG. 15 is a schematic side view of the common paper path showing a jam-preventing document guide in a lowered position.

FIG. 15 shows the addition of a document guide 210 which in a lowered position deflects an incoming document 200 by being forced by roller 216 under the deflector guide. The leading edge of a curled or damaged or deformed document (or the uncurled leading edge if the document is flat) are deflected by a document guide essentially smoothed-faced underside surface 217 and thus guide the leading edge 200b of the document into the nip 204. A tab 219 depends from near a distal end of guide 210 and rides on an edge of the print platen 203a (FIG. 16) of the printing station and functions as a down stop of the document guide 210. The document guide has a first long portion 213 which in a scanning mode position is parallel to the platen of the printing station and in position to guide a document (curled or uncurled) into the nip 204, an integral short portion 211 and a pivot 212. Arrow 220 in FIG. 17 denotes the document feed direction. The documents are constrained at their top surface by the underside 217 of the document guide and at their bottom surface by the print station platen.

Sheets which are to be printed on are clean virgin sheets without curl and thus there is no need to guide or constrain the print sheets to the common output nip. Sensors (not shown) in the document tray 201 and in the sheet feed path 199 indicate if a document is to be scanned or a sheet is to be printed. Rollers 218 are provided as part of a wet paper stacker (not shown) which functions to force the edges of the printed-on sheets to go up causing a sheet stiffness so that the sheet more accurately drops into a bin allowing for more dry time of the previous sheet.

Figure 16:
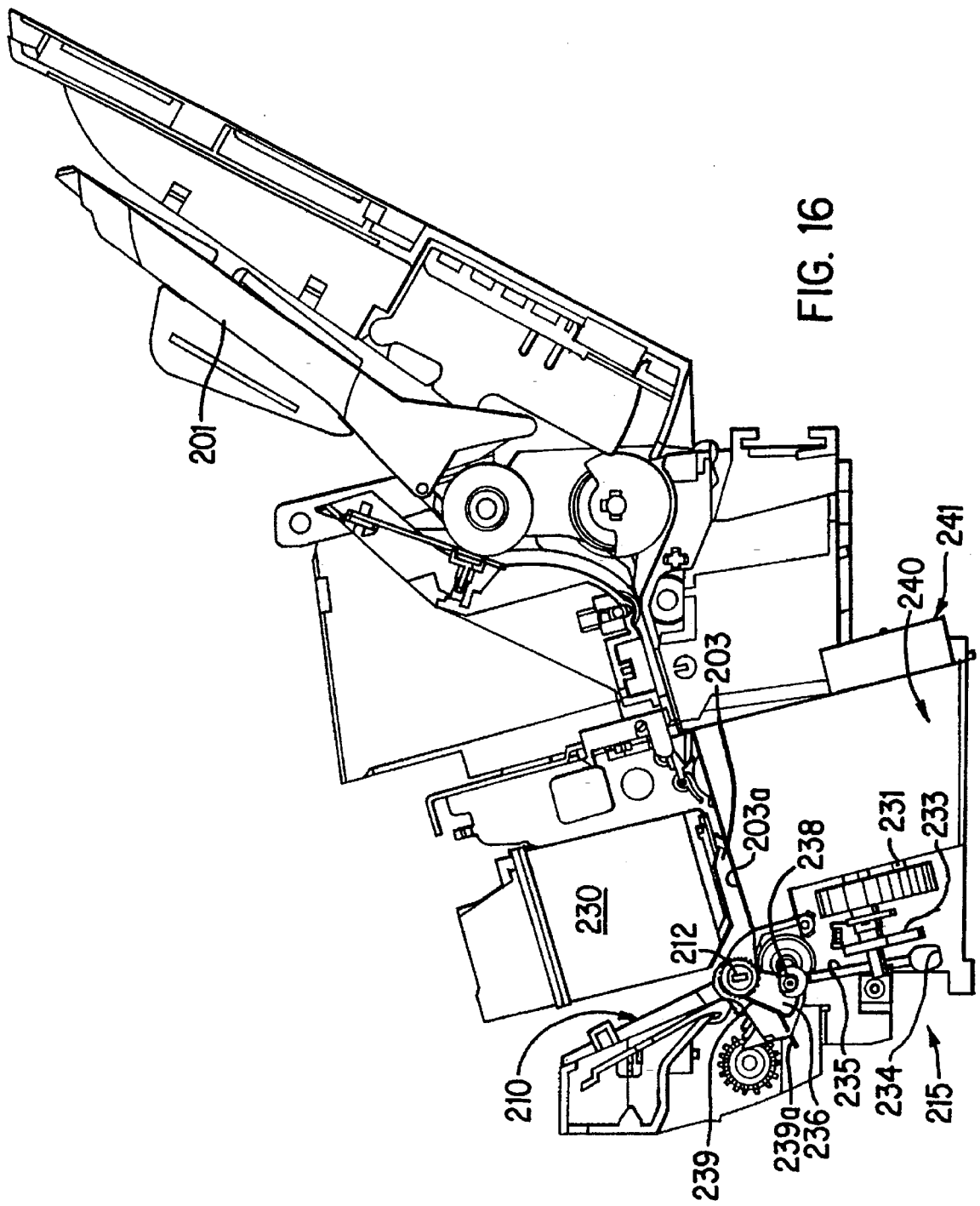
FIG. 16 is a schematic side view of the common paper path showing the document guide in a raised position allowing the print cartridge to be horizontally moved into a printing mode position.
Figure 17:
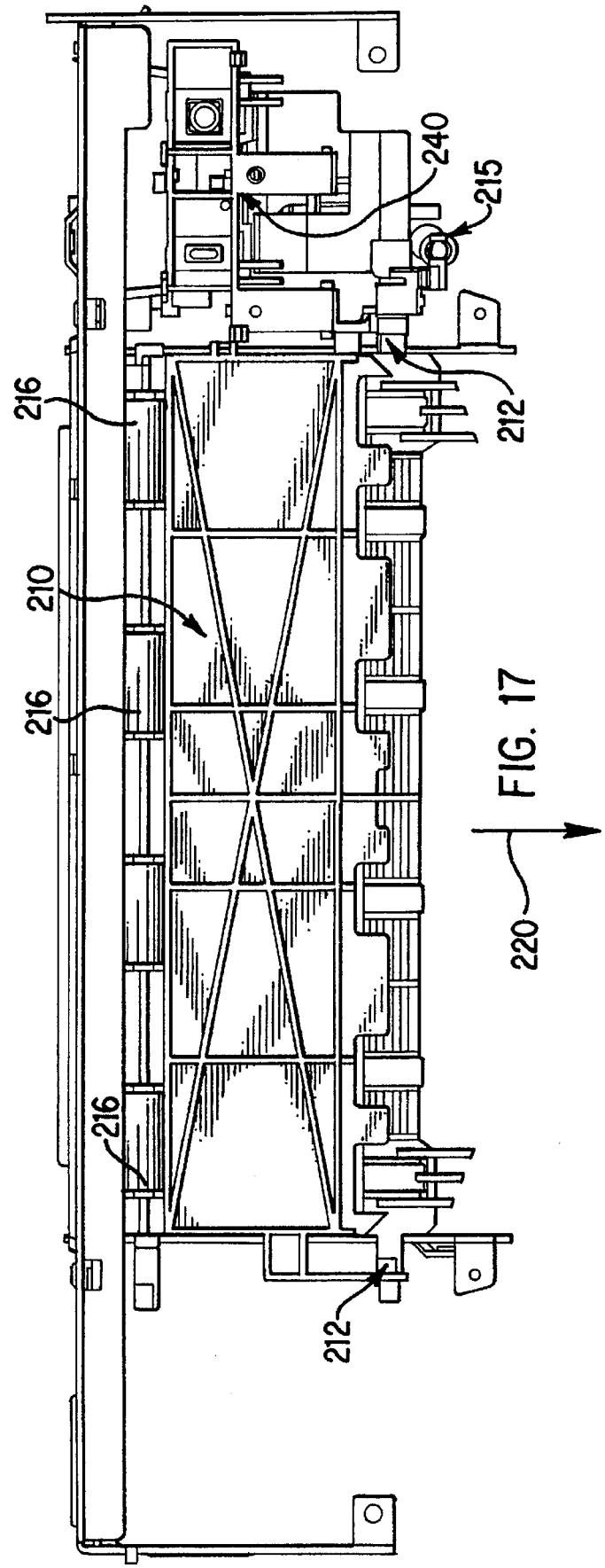
FIG. 17 is a top view of the printer station with the document guide in a scanning mode position.

As seen in FIGS. 15 and 16 a mechanism is provided to rotate and lower the document guide clockwise about 100° to 110° for a scanning mode of operation after a printing mode of operation has been completed, with the print cartridge slid away from the printing station or zone. Thereafter, a coil spring 239 having an end 239a attached to a pivot plate 236 and coiled around the pivot, which has been spring loaded by the rotary movement, returns, by the spring bias, the document guide 210 back to the raised position shown in FIG. 16. This is required to allow for the print cartridge 230 (FIG. 16) to be moved into close proximity to the paper sheet. The document guide is rotatively movable about the pivot 212 which provides a center of rotation. Actuation is provided by a linkage 215 between the document guide and the print cartridge capping and wiping system 240 (FIGS. 16 and 17). The invention makes use of a dwell state in the capping function where the capping and wiping system motor 241 continues to rotate after the print cartridge has been capped. This extra motion is connected to gear shaft 231 (FIG. 16) to the linkage 215 and is just long enough to raise the document guide when rotating the capping system motor in one direction or lower it when rotating in the other direction.

The linkage 215 includes a drive shaft 232 which rotates a lever arm 233 containing an offset ball crank 234 from the position shown in FIG. 16 to the position shown in FIG. 15 by moving a push rod 235 having a fork end 237 pushing on a fixed pin 238 on a pivot plate 236, which end rotates the pivot plate 236 fixedly connected to the document guide 210 clockwise to pivot the document guide counterclockwise (looking at FIG. 16) to its raised position in FIG. 16, permitting the print cartridge 230 (FIG. 16) to be moved laterally into the print station 203.

While specific illustrated embodiments have been shown and described, it will be appreciated by those skilled in the art that various modifications, changes and additions can be made to the methods, structures and apparatus of the invention without departing from the spirit and scope of the invention as set forth in the following claims.

We claim:

1. A method of performing multiple functions in a hardcopy device, comprising the steps of:

providing a first input feeder having a first input stack of sheets;

providing a means for picking a sheet during a printing operation;

providing a printing station and an output area, the picking means, the printing station and the output area forming a first processing path;

automatically feeding sheets from the first input stack of sheets into the first processing path by picking a sheet during the printing operation;

moving the sheet along the first processing path past the printing station where text or graphics are created on the sheet to form a printout;

delivering the printout to the output area;

providing a second input feeder having a second input stack of documents;

providing a means for picking a document during a scanning operation;

providing a scanning station for performing the scanning operation;

the picking means, the scanning station and the output area forming a second operating path;

placing documents in the second input feeder;

automatically feeding pages from the second input stack of documents into the second processing path by picking a document during the scanning operation;

moving the document along the second processing path past the scanning station where text or graphics on the documents are scanned;

constraining the document on the document top surface and document bottom surface as the document exits from the scanning station and passively passes by the printing station; and delivering the scanned document to the output area;

with at least a portion of said first and second processing paths being commonly used during both the printing operation and the scanning operation.

2. The method of claim 1 wherein said placing step includes forming the second input stack of documents to be at least partially overlying said first input stack of sheets, with said sheet picking step and said document picking step being performed on a portion of said first and second processing paths commonly used during both the printing operation and the scanning operation.

3. The method of claim 1 wherein the output area for receiving the printouts and the scanned documents of said delivering steps are included in the portion of said first and second processing paths commonly used during both the printing operation and the scanning operation.

4. The method of claim 1 wherein the printing station and the scanning station of said moving steps are included in the portion of said first and second processing paths commonly used during both the printing operation and the scanning operation.

5. The method of claim 1 wherein the first processing path and the second processing path includes a common path portion extending from the scanning station and wherein the constraining step on the document top surface is operable only in the scanning of documents.

6. A method of performing multiple functions in a hard-copy device, comprising the steps of:

providing an input print feeder having a stack of printing sheets;

providing a pick device for picking a sheet;

providing an engageable spring-loaded pressure plate for facilitating sheet feeding to the pick device;

holding the stack of printing sheets in the input print feeder; p1 maintaining constant engagement of the stack of printing sheets with the pick device while picking successive sheets by keeping the spring-loaded pressure plate in an engaged position;

providing an input scan feeder having a stack of documents;

holding the stack of documents in the input scan feeder;

moving the spring-loaded pressure plate from the engaged position to a disengaged position;

repositioning the spring-loaded pressure plate to engage the stack of documents with the pick device; and maintaining constant engagement of the stack of documents with the pick device while picking successive ones of the stack of documents by keeping the spring-loaded pressure plate in the engaged position with said stack of documents;

moving each of the documents into a scanning station and into a printing station; and after a scanning operation, constraining a scanned document on both sides of the document passively passing through the printing station to prevent a curled document from incipiently jamming in an outlet for the document.

7. The method of claim 6 which further includes the step of commencing the picking of each successive page of said printing sheets and documents after a predetermined time interval has elapsed to provide spaced-apart sheets and documents passing through said printing and said scanning stations.

8. A method of performing multiple functions in a hard-copy device, comprising the steps of:

providing a first input feeder having a stack of printing sheets;

providing a means for picking sheet pages;

providing a printing station and an output, the means for picking, the printing station and output forming a first path;

holding the stack of printing sheets in the first input feeder;

picking sheet pages from the stack of printing sheets;

moving the sheet pages along the first path through the printing station to the output;

providing a second input feeder having a stack of documents;

providing a means for picking document pages;

providing a scanning station, the means for picking document pages, the scanning station and the output forming a second path;

holding the stack of document pages in the second input feeder;

picking document pages from the stack of documents;

moving the document pages along the second path through the scanning station to the output while constraining the document pages top and bottom passively past the printing station into the output; and wherein at least a portion of the first and second paths are commonly shared.

9. The method of claim 8 wherein the constraining step on the top of the document pages is operable only in the scanning operation on the document pages.

10. The method of claim 8 further comprising:

providing a document guide;

pivotably moving the document guide, in a scanning mode of operation, into a position extending generally from an exit of said scanning station to said output to effect the constraining of scanned document pages; and pivotably moving the document guide away from the printing station for a printing mode of operation.

11. A multiple-function printer comprising:

a document feeder for holding a stack of documents to be scanned at a scanning station during a scanning mode of operation;

a sheet feeder for holding a stack of sheets to be printed on as a printing station during a printing mode of operation;

common path means connected to both said document feeder and said sheet feeder for receiving individual document pages and individual sheet pages;

common mechanism means for operatively interacting with said common path means to move said individual document pages past said scanning station to an output and to move said individual sheet pages past said printing station to the output;

wherein said common mechanism means includes a pick means for picking a document page from said document feeder during said scanning mode of operation and for picking a sheet page from said sheet feeder during said printing mode of operation; and a document guide juxtaposed to the output and pivotably moveable into the printing station for guiding and constraining a top surface of the document pages exiting the scanning station to the output.

12. The multiple-function printer of claim 11 further including a spring for spring biasing said document guide from a lowered position to a raised position for a printing mode of operation.

13. The multiple-function printer of claim 12 further including a print cartridge slidable into said printing station, said carriage including a capping system motor, said motor being connected to said rotation means to raise or lower the document guide.

14. A method of preventing paper jams in a multi-function printer having a scanning station for scanning documents delivered to the scanning station and a printing station juxtaposed to the scanning station for printing sheets delivered to the printing station, the printing station including a movable print cartridge, a print platen forming an output exit from the scanning station, a document guide and an outlet roller, the method comprising:

moving the print cartridge away from the print platen;

delivering a document to be scanned into the scanning station;

delivering a potentially curled scanned document to and along the print platen with an underside of the document facing the print platen; and moving the document guide from a raised first position into a lowered second position to deflect the scanned document in a feed direction into the output roller, while constraining a top surface of the scanned document between the print platen and the document guide.

15. The method of claim 14 wherein the output roller includes a second roller, the rollers forming a roller nip and further including the steps of deflecting and constraining the scanned document into the roller nip for exiting the scanned document from the printer.

16. The method of claim 14 further including the steps of moving the document guide back to the first position; moving the print cartridge into close proximity to the print platen; and printing on a printing sheet delivered to the printing station and to the print platen.

17. The method of claim 16 wherein the step of moving the document guide back comprises the step of spring biasing the document guide back to the first position raised from the print platen.

18. The method of claim 14 wherein the step of moving the document guide comprises pivoting the document guide from the first position to the second position wherein the document guide is parallel to the print platen.

19. A multiple-function printer comprising:

a scanning station for scanning documents delivered to the scanning station;

a printing station downstream from the scanning station for printing sheets delivered to the printing station, the printing station including a movable print cartridge and a print platen forming an output exit from the scanning station;

a document guide movable from the print platen to allow the print cartridge to move into the print platen;

a mechanism to move the document guide into a position over the print platen after the print cartridge is moved away from the print platen;

an output roller downstream from the print platen; and wherein the document guide deflects, constrains and delivers a scanned document to said output roller.

20. The printer of claim 19 wherein the output roller comprises a pair of rollers forming a roller nip, into which the document guide guides the scanned document; and wherein said mechanism includes a drive shaft, a ball crank and pivot linked to the document guide to rotate the document guide to the print platen to constrain a top surface of the scanned document passing over the print platen.

* * * * *

UNITED STATES PATENT AND TRADEMARK OFFICE
CERTIFICATE OF CORRECTION

PATENT NO     : 5,651,623

DATED         : July 29, 1997

INVENTOR(S)   : Stodder et al.

It is certified that error appears in the above-identified patent and that said Letters Patent is hereby corrected as shown below:

At Column 3, line 31, delete "overly" and insert in lieu thereof --overlay--.

At Column 4, line 13, delete "sheets" and insert in lieu thereof --sheet--.

At Column 4, line 43, delete "ASP" and insert in lieu thereof --ASF--.

At Column 5, line 45, delete "ASP" and insert in lieu thereof --ASF--.

At Column 7, line 12, delete "shred" and insert in lieu thereof --shared--.

At Column 9, line 36, delete "p1" in front of "maintaining".

Signed and Sealed this

Second Day of June, 1998

Attest:

BRUCE LEHMAN

*Attesting Officer*        Commissioner of Patents and Trademarks